Dec. 12, 1950 — W. COOPEY — 2,534,000
PROCESS FOR PRODUCING HYDROCYANIC ACID
Filed Oct. 9, 1945

INVENTOR.
WALTER COOPEY
ATTORNEY

Patented Dec. 12, 1950

2,534,000

UNITED STATES PATENT OFFICE 2,534,000

PROCESS FOR PRODUCING HYDROCYANIC ACID

Walter Coopey, Charleston, W. Va., assignor to E. I. du Pont de Nemours & Company, Wilmington, Del., a corporation of Delaware Application October 9, 1945, Serial No. 621,373

2 Claims. (Cl. 23—151)

This invention relates to a process for the preparation of hydrocyanic acid and more particularly to a process for its preparation from formamide and to apparatus therefor.

In catalytic reactions which are highly endothermic and especially those conducted at high temperature levels, such as the catalytic conversion of formamide to hydrocyanic acid, it is essential that efficient heat exchange means be provided in order that sufficient heat flows into the catalyst to maintain the reaction at temperature. Moreover, in the formamide to hydrocyanic acid reaction many precautions must be taken in bringing the formamide up to the temperature of conversion which is conducted with the formamide in the vapor phase. Considerable difficulty has heretofore been encountered in vaporizing formamide because it decomposes rapidly at its boiling point 192° C.–195° C. to carbon monoxide and ammonia. To avoid decomposition it has been proposed heretofore to vaporize the formamide at reduced pressure, to vaporize it from heated surfaces and to flash vaporize it. Such proposals require more or less elaborate apparatus necessitating careful control which have not been entirely satisfactory due to decomposition, inability to provide sufficient uniform heat distribution, plugging of apparatus and feed lines and other operating difficulties.

An object of the present invention is to provide a process for the preparation of hydrocyanic acid. Another object is to provide an economical process for vaporizing formamide. A further object is to provide a process for efficiently and catalytically converting formamide to hydrocyanic acid by a vapor phase process. Other objects and advantages of the invention will hereinafter appear.

The catalytic conversion in the vapor phase of formamide to hydrocyanic acid is well known, the reaction taking place in the vapor phase at a temperature between 400 and 650° C. usually under atmospheric pressure in the presence of suitable catalysts for the reaction such, of example, as chromium, aluminum and/or manganese metal filings, activated charcoal, alumina, pumice and other metals and their oxides. The invention of this case is not directed to conditions of temperature, pressure or catalysts, which are well known, but to the manner of conducting the reaction.

Figure 1:
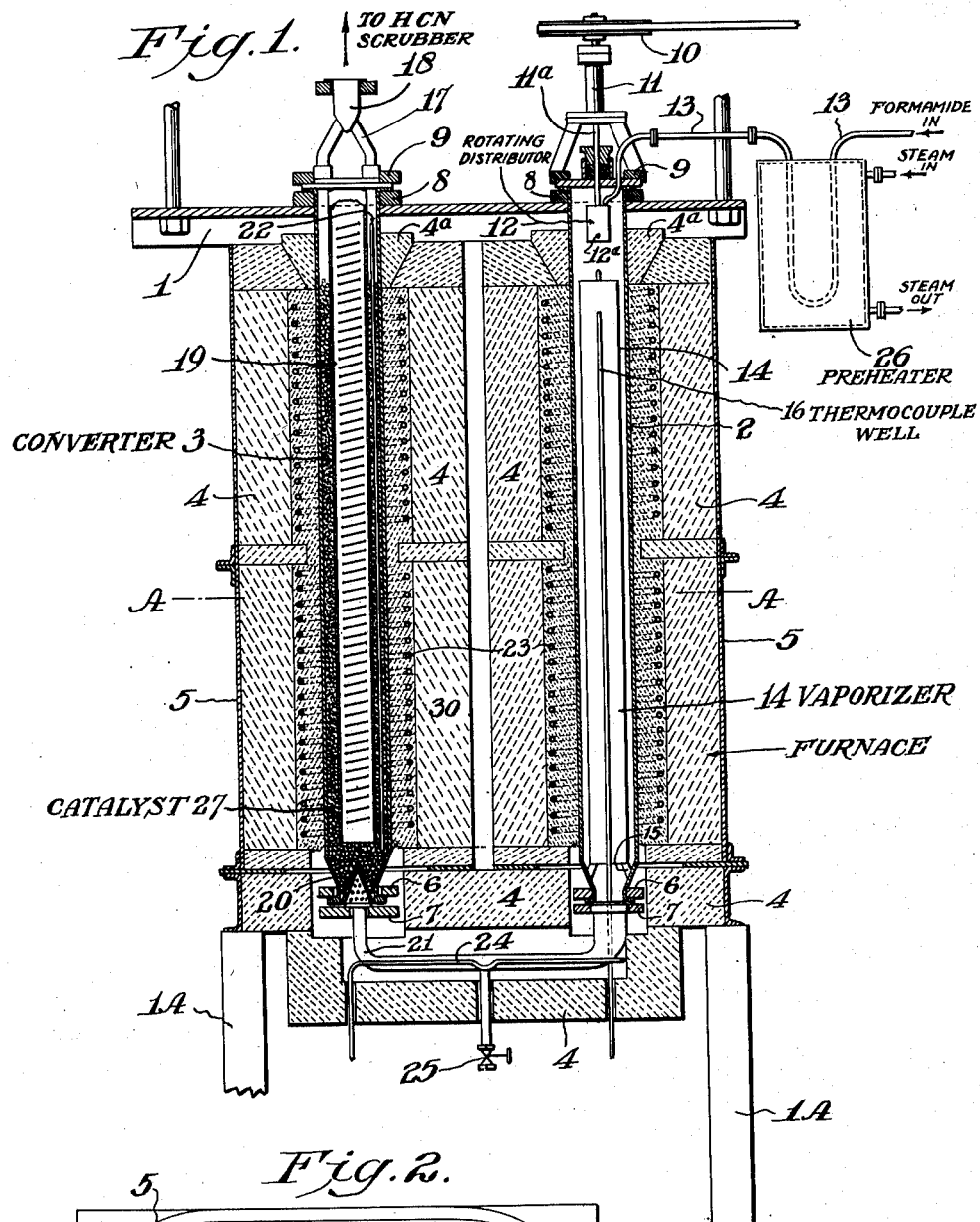

The accompanying drawing which is a diagrammatic cross sectional elevation through the center of a preferred embodiment of the invention illustrates an apparatus in which formamide can be efficiently and economically hydrogenated to hydrocyanic acid. Referring to Fig. 1 of the drawing, I is a metal support from which two reaction vessels 2 and 3, are suspended, vessel 2 being a vaporizer for formamide, vessel 3 a catalytic reaction converter, the vessels being disposed in insulating jackets 4 and 5 supported on a metal support 1A.

Inasmuch as the catalytic conversion of formamide to hydrocyanic acid is a high temperature reaction requiring the addition of heat, the vessels are encased in insulation 30 and heat resisting brick walls 4, encased in steel 5.

Directing our attention to the formamide vaporizer 2, this vessel is a metallic tube, of for example aluminum or its alloys or other metal having no effect on the vapors, flanged at top and bottom, the upper flange 8 supporting the tube 2 and resting on support 1. The tube 2 is loosely fitted into the upper furnace wall cap 4a which permits expansion and contraction during the heating and cooling operation. The upper flange 8 of tube 2 is also bolted to a liquid distributing mechanism through flange 9, said liquid distributing mechanism comprising a power driven pulley 10, bearings 11 and shaft 11a. An aluminum distributor 12 which is cup shaped and closed at the bottom is fixed to shaft 11a. Pipe 13 extends into the top of distributor 12. Centrally supported within the vaporizer tube 2 is a tube 14 closed at the top and constructed of alloy steel which provides an annulus between its outer wall and the inner wall of the tube 2, see Fig. 2. Tube 14 is supported by structural members 15 which centers tube 14 in the vaporizer tube 2. A thermocouple well 16 is provided within tube 14.

The catalyst reaction tube 3, constructed of any suitable metal such, for example, as copper or stainless steel with an inner surface of copper, is located in a separate furnace adjacent the furnace of the vaporizer tube 2. The catalyst tube 3 is supported on flanges 8 and 9 in a manner similar to the support of the vaporizer tube 2. The upper flange 8 of catalyst tube 3 is bolted to flange 9 which supports an annular header 17 heading into tube 18. Flanges 8 and 9 of the catalyst tube likewise support a copper core tube or cylinder 19 having the same axis as the catalyst tube 3, tube 19 is closed at the top and bottom. Tube 19 does not reach to the bottom of the catalyst tube 3. Expansion and contraction of the catalyst tube 3 is compensated for by movement through the furnace wall cap 4a while heat expansion and contraction of the tube 19 is compensated for by movement into the catalyst tube 3. The annulus between the outer wall of tube 19 and the inner wall of catalyst tube 3 is packed with a suitable catalyst for the reaction. The conical screen 20 prevents the catalyst from settling into tube 21 which provides a conduit between the vaporizing tube 2 and the catalyst tube 3. Thermocouple well 22 is provided within the catalyst bed for observing its temperature during conversion.

Figure 2:
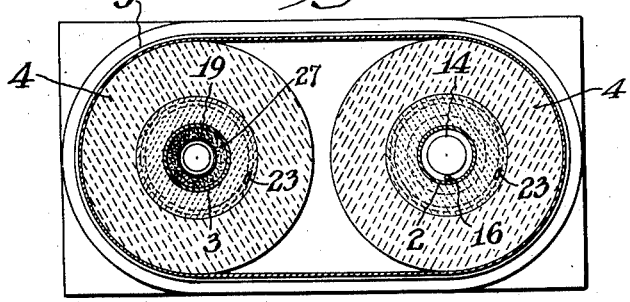

The vaporizing tube 2 and catalyst tube 3 are heated by radiant heat from electrically insulated electrical resistance heating elements 23 embedded in heat insulation 30 which fills the annulus between the outer walls respectively of the vaporizer tube 2 and catalyst tube 3 and the inner walls of the furnace. Fig. 2, a cross section taken at AA, shows these annuli. The lower portion of the vaporizer tube 2 is used as a superheater of the vaporized formamide and additional heating elements are provided about the tube at this position to effect this result. Tube 21 interconnecting the vaporizer and catalyst tubes, is provided with an electrical heating element 24 and a drain 25. A steam heated preheater 26, the use of which is optional, may be used to preheat the formamide as it flows through pipe 13 into the rotating distributor cup 12.

The converter and vaporizer operate in this manner. Liquid formamide is continuously introduced into pipe 13, flows into the preheater 26 wherein its temperature is raised to between 135 and 140° C. The temperature of the formamide should not exceed 140° C. for at such temperatures it decomposes to carbon monoxide and ammonia and these gases inter alia produce erratic fluctuations in flow through the apparatus which are detrimental to efficient operation. The preheated formamide flows from pipe 13 into the rotating distributor 12 which is provided with two diametrically opposed holes in its periphery 12a, one of which is shown. As the distributor spins at a speed in the order of 200 R. P. M., the liquid formamide is discharged through the small holes 12a against the inner walls of the vaporizer tube 2 forming a liquid film which flows downwardly. The tube is heated sufficiently to vaporize rapidly the formamide and as the vapors are forced downward they are superheated to a temperature of between 400 and 500° C. at which temperature they pass from the bottom of the vaporizer. The thus vaporized and superheated formamide passes through the conduit 21 over the heating element 24 through the screen 20 and into the catalyst tube wherein it comes in direct contact with the catalyst 27. If desired copper rings, silica or other material may be placed immediately above screen 20 to provide additional preheat for the vapors just prior to the reaction. Due to the high endothermicity of the reaction heat is provided not only from the electric heating elements 23, surrounding the catalyst tube 3, but also from heating elements located within the core tube 19. By these multiple means an adequate amount of heat can be passed into the catalyst thereby replacing the large amount of heat lost during the course of the reaction. The gases pass upwardly through the annular catalyst space 27 into the annular header 17 and out through the tube 18 to a scrubber not shown, wherein the hydrocyanic acid is separated by any suitable means from the other gases of the reaction.

When the above method and apparatus are operated with formamide, preheated to a temperature of about 135° C. and vaporized in a vaporizer tube to a temperature between 420 and 460° C. with converter temperatures at about 500–600° C. employing a manganese metal catalyst approximately a 90% yield of hydrocyanic acid can be continuously maintained.

It is apparent from the above description that the apparatus and method described herein specifically for the conversion of formamide to hydrocyanic acid are likewise applicable for use in other organic reactions of an endothermic nature and especially for use in such reactions in which it is difficult to vaporize the reactants without undue decomposition.

I claim:

1. In a process for the catalytic conversion of formamide to hydrocyanic acid, the steps which comprise preheating liquid formamide to a temperature between 135 and 140° C., forming the preheated liquid in the shape of a falling film of annular cross section, externally and internally heating the film while passing it downwardly through a zone of vaporization, vaporizing the liquid and superheating the resulting vapor while maintaining the annular shape of the fluids, passing the vapors immediately after being superheated, and without substantial loss of superheat, up and through a heated catalyst zone of annular cross section wherein the formamide is pyrolyzed to hydrocyanic acid in the presence of a manganese catalyst at a temperature between 400 and 650° C. and supplying heat to the reaction by heat flow into the zone through the outer and inner concentric boundaries thereof.

2. In a process for the catalytic conversion of formamide to hydrocyanic acid, the steps which comprise preheating liquid formamide to a temperature between 135 and 140° C., forming the preheated liquid by spraying in the shape of a falling film of annular cross section, externally and internally heating the film while passing it downwardy through a zone of vaporization, vaporizing the liquid and superheating the resulting vapor to a temperature between 400 and 500° C. while maintaining the annular shape of the fluids, passing the vapors immediately after being superheated and without substantial loss of superheat up and through a heated catalyst zone of annular cross section wherein the formamide is pyrolyzed in the presence of a manganese catalyst to hydrocyanic acid and supplying heat to the reaction by heat flow into the zone through outer and inner concentric boundaries of the zone.

WALTER COOPEY.

REFERENCES CITED

The following references are of record in the file of this patent:

UNITED STATES PATENTS

| Number | Name | Date |
|---|---|---|
| 1,675,366 | Magill et al. | July 3, 1928 |
| 1,793,181 | Legeler et al. | Feb. 17, 1931 |
| 1,934,433 | Lacy | Nov. 7, 1933 |
| 1,996,852 | Bergell | Apr. 9, 1935 |
| 2,212,583 | Broderson | Aug. 27, 1940 |